July 7, 1970  R. N. SCHMIDT  3,519,067

VARIABLE THERMAL CONDUCTANCE DEVICES

Filed Dec. 28, 1967  2 Sheets-Sheet 1

INVENTOR.
ROGER N. SCHMIDT
BY Charles J. Ungemack

ATTORNEY

INVENTOR.
ROGER N. SCHMIDT
BY Charles J. Ungemach
ATTORNEY

United States Patent Office 3,519,067
Patented July 7, 1970

3,519,067
VARIABLE THERMAL CONDUCTANCE DEVICES
Roger N. Schmidt, Minnetonka Village, Minn., assignor to Honeywell Inc., Minneapolis, Minn., a corporation of Delaware
Filed Dec. 28, 1967, Ser. No. 694,148
Int. Cl. G05d 23/00; F28d 15/00
U.S. Cl. 165—32        2 Claims

ABSTRACT OF THE DISCLOSURE

Apparatus for transferring heat from a source to a sink, containing a fluid and two capillary wicks. Heat is transferred by a vaporization-condensation process. The fluid is vaporized by the heat from the source and the vaporized fluid is condensed at the sink. The capillary wicks transport the condensed fluid back to the source where it is again vaporized. The wicks alternately make and break in response to the temperature of the source (or the sink) so that the amount of fluid flow is controlled, thereby also controlling the heat flow. In another embodiment a single wick is squeezed to control the amount of fluid which can flow through it.

BACKGROUND OF THE INVENTION

The invention is in the field of heat transfer. More particularly, the invention concerns apparatus for transferring heat by a vaporization-condensation process wherein the condensate is returned to the point where vaporization occurs, by a controllable capillary wick means which controls or limits the amount of condensate returned and hence also controls the amount of heat transferred.

It is common in the prior art to provide "heat pipes" with a fixed wick which operate on the vaporization-condensation principle, but it is novel to control the amount of heat transferred within the pipe by controlling the fluid flow in the wick means in response to a control or reference temperature.

DESCRIPTION OF THE PREFERRED EMBODIMENTS

Figure 1:
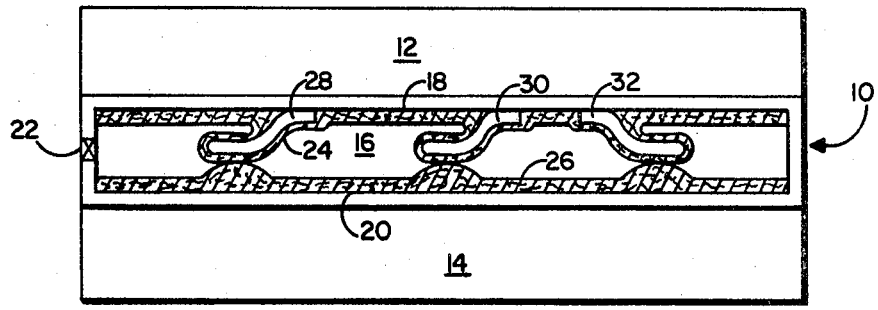
FIG. 1 is a cross sectional view of one embodiment of a variable conductance wall.

FIG. 1 illustrates a variable thermal conductance wall 10 inserted between a heat source 12 and a heat sink 14. Wall 10 is used to transfer heat from source 12 to sink 14. Wall 10 forms an enclosure defining a chamber 16 having a surface area 18 associated with source 12 and a surface area 20 associated with sink 14. A fluid is introduced into chamber 16 by means of a port 22 in the left end of wall 10. After the introduction of fluid into chamber 16, port 22 is sealed. Sealed port 22 also provides a safety feature in that if the pressure in chamber 16 should exceed predetermined limits, the seal associated with port 22 will rupture. The fluid introduced into chamber 16 normally is vaporized at the surface area 18 and condensed at the surface area 20. The fluid picks up heat when it vaporizes at surface 18 and deposits or gives up heat when it condenses at surface 20. A first capillary wick 24 is mounted on surface area 18 and a second capillary wick 26 is mounted on surface area 20. Bimetal elements 28, 30 and 32 are mounted on surface area 18 and within wick 24. The bimetal elements are responsive to the temperature of source 12 and when the temperature of source 12 reaches a predetermined level, bimetal elements 28, 30 and 32 bend and cause wick 24 to physically contact wick 26 at three points. In this way the rate at which condensed fluid can be transported back to area 18 for revaporization is controlled. When the temperature of source 12 falls to some predetermined level, the bimetal elements 28, 30 and 32 bend back to their original positions and open the path between wicks 24 and 26. When the path between wicks 24 and 26 is open, the fluid at surface 18 is eventually completely vaporized and efficient heat transfer ceases. Fuid for vaporization at surface 18 is not available because it cannot be transferred from wick 26 to wick 24 unless contact is being made between the wicks. It is apparent then that the temperature of source 12 can be controlled within predetermined upper and lower limits.

Figure 2:
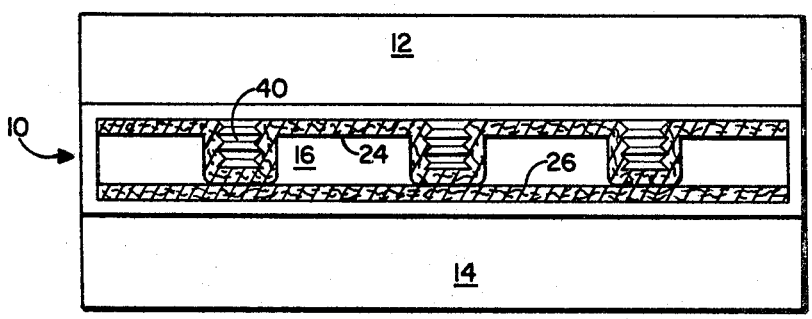
FIG. 2 is a cross sectional view of a second embodiment of the variable conductance wall.

FIG. 2 discloses another embodiment of the variable thermal conductance wall 10. The variable conductance wall shown in FIG. 2 is almost identical to that shown in FIG. 1 except that a liquid filled bellows 40 is utilized rather than a bimetal element such as element 28 in FIG. 1. Otherwise the operation of the embodiment of FIG. 2 is the same as that shown in FIG. 1. An increasing temperature in source 12 causes the fluid filled bellows 40 to expand moving wick 24 into contact with wick 26. A decreasing temperature in source 12 causes the fluid filled bellows 40 to contract separating wick 24 from wick 26.

Figures 3, 4:
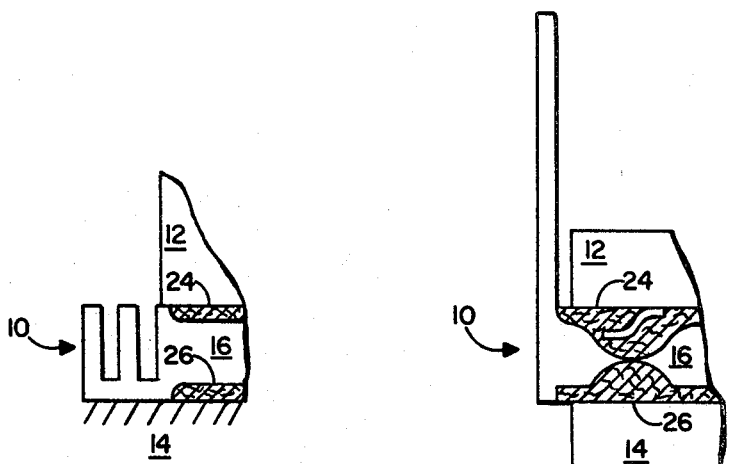
FIG. 3 illustrates a scheme for reducing the conductance at the ends of the variable conductance wall.
FIG. 4 illustrates a second scheme for reducing the conductance at the ends of the variable conductance wall.

FIGS. 3 and 4 both show schemes for reducing the conductance of the end portions of wall 10. In each case the length of the thermal paths at the ends of the wall are increased. In FIG. 3 the end portions of wall 10 are corrugated, i.e., have a plurality of folds. Thus the heat path through the end of wall 10 between source 12 and sink 14 is much longer than if a straight end had been provided.

In FIG. 4 wall 10 is provided with a single long fold. In the scheme shown in FIG. 4, as in FIG. 3, a long thermal path is provided at the ends of variable thermal conductance wall 10. In other words, it is desirable that variable conductance wall 10 conduct relatively small amounts of heat through its ends. Instead, it is desired that the bulk of the heat be transmitted by means of the vaporization-condensation process occurring within chamber 16.

Figure 5:
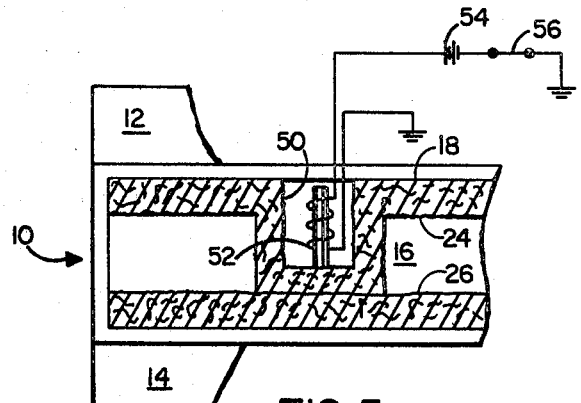
FIG. 5 is a cross sectional view of an electrically modulated variable conductance wall.

FIG. 5 discloses a variable thermal conductance wall which is electrically modulated. A solenoid means 52 is mounted within a bellows 50, the bellows 50 being within wick 24. A source of direct current 54 and a switch 56 are connected in series with solenoid means 52. As shown, switch 56 is energized and therefore current is being supplied to solenoid means 52 which causes bellows 50 to expand and push wick 24 into contact with wick 26. When switch 56 is opened, solenoid means 52 is deenergized, bellows 50 contracts and wick 24 separates from wick 26. Thus, for example, switch 52 could be responsive to the temperature of source 12 and close when the temperature of source 12 reaches some predetermined upper limit. Switch 56 would also be designed to open when the temperature of source 12 dropped to some predetermined lower limit. In this way, the conductance of wall 10 is said to be modulated.

The variable thermal conductance wall 10 in FIG. 5 has another feature which has not heretofore been brought out. The fine cross hatching of wick 24 denotes a fine wick whereas the coarse cross hatching of wick 26 denotes a coarse wick. A strong suction is associated with the fine wick whereas a high storage capacity is associated with the coarse wick. Note also that although wick 24 is shown as a unitary structure, it may be made up of two or more pieces of wicking.

Figure 6:
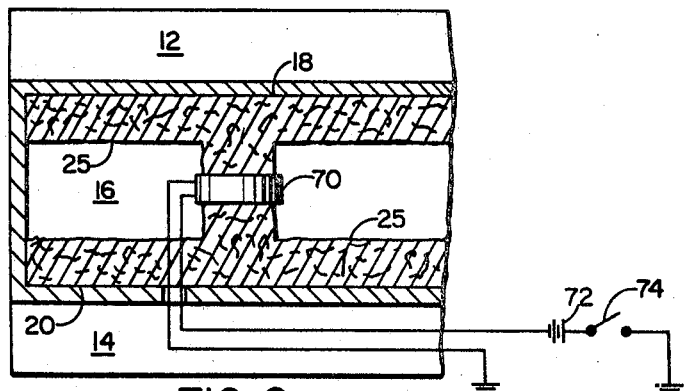
FIGS. 6 and 7 are cross sectional views of another embodiment of the variable conductance wall.
Figure 7:
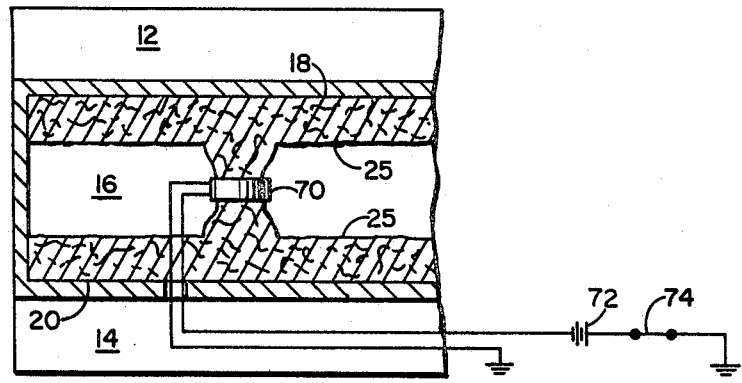

FIGS. 6 and 7 show another embodiment of the variable conductance wall. In this embodiment there is a single wick structure 25 rather than a pair of wicks. Wick 25 has a relatively narrow middle portion about which is mounted a squeezing band 70. Band 70 is electrically actuated by a supply voltage 72 when switch 74 is closed. Switch 74 represents a device which is sensitive to temperature. In FIG. 6 the band 70 is de-energized and is not squeezing wick 25. A maximum amount of fluid is transported from surface 20 to surface 18 by the capillary action of wick 25. In FIG. 7 band 70 is shown energized and squeezing the middle portion of wick 25, thereby restricting the capillary flow to a minimum. Although a band 70 is shown as providing the squeezing function, it is obvious that a variety of other devices may be used. Whereas band 70 squeezes in two dimensions, squeezing in a single dimension may be provided, e.g., like that in a common vise.

There are probably other embodiments besides those shown which would come within the scope of the invention. There are many ways in which one of the wicks can be actuated so that it contacts the other wick. With this in mind, the invention is to be limited only by the following claims.

I claim:
1. Apparatus for transferring heat between a heat source and a heat sink comprising:
   an enclosure defining a chamber having one surface associated with the source and another surface associated with the sink, the two surface areas joined by a third surface, the third surface being corrugated with at least one fold to effectively increase the length of the heat path along the third surface and thereby reduce the heat conductance of the third surface;
   a fluid sealed in the chamber, the fluid normally vaporized in the area of the surface associated with the heat source and condensed in the area of the surface associated with the heat sink;
   capillary wick means mounted in the chamber between the surfaces associated with the source and sink; and
   means adjusting the wick means for variably impeding the flow of fluid in the wick means.

2. Apparatus for transferring heat between a heat source and a heat sink comprising:
   an enclosure defining a chamber having one surface associated with the source and another surface associated with the sink, the two surfaces joined by a third surface;
   a fluid sealed in the chamber, the fluid normally vaporized in the area of the surface associated with the heat source and condensed in the area of the surface associated with the heat sink;
   a first capillary wick mounted on the surface of the chamber associated with the heat source and a second capillary wick mounted on the surface of the chamber associated with the heat sink, the first wick being made up of fibers which are finer than those in the second wick; and
   means for causing the first and second wicks to contact directly and separate in response to a temperature change.

References Cited

UNITED STATES PATENTS

| 3,225,820 | 12/1965 | Riordan | 165—32 X |
| 3,399,717 | 9/1968 | Cline | 165—105 X |
| 3,402,761 | 9/1968 | Swet | 165—105 |
| 2,288,341 | 6/1942 | Addink | 317—234 X |
| 3,414,050 | 12/1968 | Anand | 165—105 X |

MEYER PERLIN, Primary Examiner

A. W. DAVIS, Jr., Assistant Examiner

U.S. Cl. X.R.

62—514; 165—105